US012386960B2

(12) United States Patent
Briliauskas et al.

(10) Patent No.: US 12,386,960 B2
(45) Date of Patent: *Aug. 12, 2025

(54) SYSTEM AND METHOD FOR TRAINING OF ANTIMALWARE MACHINE LEARNING MODELS

(71) Applicant: UAB 360 IT, Vilnius (LT)

(72) Inventors: Mantas Briliauskas, Vilnius (LT); Dainius Ražinskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 113 days.

This patent is subject to a terminal disclaimer.

(21) Appl. No.: 18/220,878

(22) Filed: Jul. 12, 2023

(65) Prior Publication Data

US 2023/0351017 A1    Nov. 2, 2023

Related U.S. Application Data

(63) Continuation-in-part of application No. 17/686,970, filed on Mar. 4, 2022, now Pat. No. 11,727,113.

(51) Int. Cl.
*G06F 21/56* (2013.01)
*G06N 20/00* (2019.01)

(52) U.S. Cl.
CPC ........... *G06F 21/565* (2013.01); *G06N 20/00* (2019.01); *G06F 2221/033* (2013.01)

(58) Field of Classification Search
CPC .................................................... G06F 21/565
See application file for complete search history.

(56) References Cited

U.S. PATENT DOCUMENTS

| 8,769,685 | B1 | 7/2014 | Conrad et al. |
| 2004/0172551 | A1 | 9/2004 | Fielding et al. |
| 2007/0220043 | A1 | 9/2007 | Oliver et al. |
| 2016/0112444 | A1 | 4/2016 | Palumbo et al. |
| 2020/0327227 | A1 | 10/2020 | Chebyshev et al. |
| 2021/0287140 | A1 | 9/2021 | Varghese et al. |

*Primary Examiner* — Simon P Kanaan
(74) *Attorney, Agent, or Firm* — Moser Taboada

(57) ABSTRACT

Systems and methods for computer security are provided by a processor programmed to: receive an Internet file and produce a hash of the Internet file; compare the hash to external malware databases and external antiviral databases for a file match to determine the Internet file's status that is based upon a weighted consensus algorithm derived from the external malware databases and the external antiviral databases; check if the Internet file's status determination matches the internal software database Internet file's status and update the internal software database based upon the Internet file's status determination if a threshold for the weighted consensus algorithm is exceeded; and train a machine learning algorithm using the Internet file's status determination to create a labeled data set based upon the Internet file's status determination, and provide a report via the input/output device based upon the Internet file's status determination.

20 Claims, 4 Drawing Sheets

SYSTEM AND METHOD FOR TRAINING OF ANTIMALWARE MACHINE LEARNING MODELS

CROSS-REFERENCE TO RELATED APPLICATIONS

This application is a continuation in part of and claims the benefit of U.S. patent application Ser. No. 17/686,970 filed Mar. 4, 2022, which is herein incorporated by reference in its entirety.

FIELD

The invention relates generally to computer security, and more particularly to identifying security issues in Internet downloaded files.

BACKGROUND

The traditional line of defense against malware is composed of anti-malware (AM) detectors such as virus and spyware scanners. Static analysis is a process of analyzing a malware binary without actually running the code. Static analysis is generally performed by determining the signature of the binary file which is a unique identification for the binary file and can be done by calculating a hash of the file and understanding each component. To enhance capability, many AM applications rely on machine learning models (ML) to detect malicious code. However, the training of the anti-malware ML models is typically limited by the number of files the AM application provider has statically analyzed for potential malware. Thus, many files that include malicious code get missed by AM applications since the ML model they may be relying on has never seen that type of file or malicious code.

Therefore, there is a need for improved methods and systems for training of antimalware machine learning models.

SUMMARY

Systems and methods for computer security are provided herein. In some embodiments, the system includes an input/output device, an internal malicious software database; a processor programmed to: receive an Internet file and produce a hash of the Internet file; compare the hash to external malware databases and external antiviral databases for a malicious file match to determine the Internet file's status that is based upon a weighted consensus algorithm derived from the external malware databases and the external antiviral databases; check if the Internet file's status determination matches the internal malicious software database Internet file's status and update the internal malicious software database based upon the Internet file's status determination if a threshold for the weighted consensus algorithm is exceeded; and train a machine learning algorithm using the Internet file's status determination to create a labeled data set based upon the Internet file's status determination, and provide a report via the input/output device based upon the Internet file's status determination.

In some embodiments, the hash comprises a vector-based hash which can be created using techniques including, but not limited to, at least one of Locality Sensitive Hashing, SimHash, or MinHash.

In other method embodiments, the method includes receiving an Internet file and producing a hash of the Internet file; comparing the hash to external malware databases and external antiviral databases for a malicious file match to determine the Internet file's status that is based upon a weighted consensus algorithm derived from the external malware databases and the external antiviral databases; checking if the Internet file's status determination matches the internal malicious software database Internet file's status and updating the internal malicious software database based upon the Internet file's status determination if a threshold for the weighted consensus algorithm is exceeded; and training a machine learning algorithm using the Internet file's status determination to create a labeled data set based upon the Internet file's status determination, and providing a report via the input/output device based upon the Internet file's status determination.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
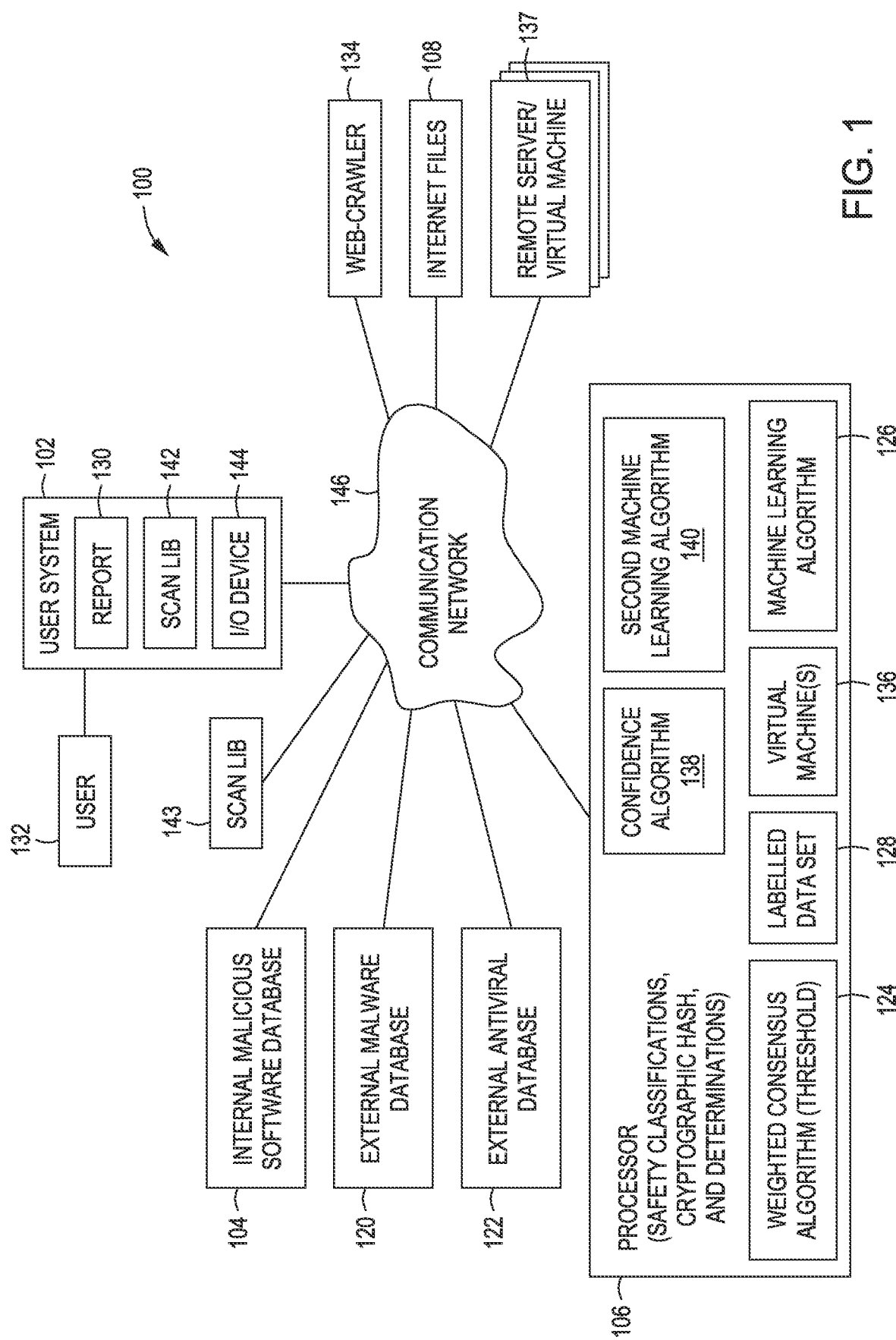
FIG. 1 depicts a high-level block diagram of a network architecture of a system for training a computer security algorithm in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for training computer security machine learning models. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Some anti-malware applications rely on machine learning to detect malicious code. Embodiments consistent with the invention use a way of training a machine learning algorithm via known outcomes. In some embodiments, the system 100 includes a core infrastructure server(s) 101 that includes an internal malicious software database 104 and a user system 102 having an input/output device 144. The internal malicious software database 104 is continually updated with the most recent safety classifications for known files, for example. In some embodiments, an internal malicious software database 103 may also be stored on user system 102 or on a separate server associated with system 100. The internal malicious software database 103 may be continually updated via the network with the entries from the internal malicious software database 104 (e.g., internal malicious software database 103 may be a mirror copy of internal malicious software database 104). The core infrastructure server 101 includes a processor/driver 106 (also referred to as an application system driver) programmed to: receive an Internet file 108 and produce a hash of the Internet file; compare the hash to external malware databases 120 and external antiviral databases 122 for a malicious file match to determine the Internet file's status that is based upon a weighted consensus algorithm 124 derived from the external malware databases and the external antiviral databases; check if the Internet file's status determination matches the internal malicious software database 104 Internet file's status and update the internal malicious software database based upon the Internet file's status determination if a threshold for the weighted consensus algorithm is exceeded; and train a machine learning algorithm 126 using the Internet file's status determination to create a labeled data set 128 based upon the Internet file's status determination, and provide a report 130 via the input/output device 144 on the user system 102 based upon the Internet file's status determination.

In some embodiments, the hash of the present principles includes a vector-based hash/hashing function. Vector-based hashing functions, also known as vector hash functions, are a type of hash function that operates on vectors or high-dimensional data. These functions are designed to generate hash codes or signatures for vectors in a way that preserves the similarity relationships between them. In traditional hash functions, the input is typically a single value or a fixed-length sequence of values. However, vector-based hashing functions handle vectors as inputs, which can represent complex data structures such as images, text documents, or numerical feature vectors.

The vector-based hashing functions map similar vectors to similar hash codes or signatures, while ensuring that different vectors have a low probability of colliding or producing the same hash code. This property is crucial in applications such as nearest neighbor search, similarity search, and data indexing.

In vector-based hashing functions, the input vectors are projected onto a lower-dimensional space using techniques like random projections or spectral embeddings. These projections preserve the original vector's similarity relationships while reducing the dimensionality, which helps to improve computational efficiency. Once the vectors are projected into the lower-dimensional space, a traditional hash function can be applied to generate the hash code or signature. This code can be used for various purposes, such as indexing, clustering, or similarity comparison.

In malware detection of the present principles, vector-based hashing functions can help identify similar malicious code portions quickly by comparing the vector-based hashes. The hashes do not need to be identical to stored hash in a malware database but can be similar enough to be considered malicious. In some embodiments, the vector-based hash of the present principles can be determined using one or more of the vector-based hashing techniques including, but not limited to, Locality Sensitive Hashing (LSH), SimHash, and MinHash.

The LSH vector-based hashing operates by creating a hash function that maps similar data points to the same "bucket" with a high probability. The hash function takes the data points as input and produces a hash value or signature, which is a fixed-length representation of the data. The crucial aspect of LSH is that it's designed in such a way that similar data points have a high chance of being mapped to the same bucket, while dissimilar data points are likely to be mapped to different buckets. LSH can be implemented to organize and categorize malicious code based on similarity. Instead of reviewing each part of malicious code individually, LSH groups similar parts of code together based on their hash values or signatures. Subsequently, each item in the same "bucket" can be provided with a label.

The SimHash vector-based hashing is a technique that provides a way to compare and measure similarity between different samples of malicious code. In some embodiments, SimHash works by converting malicious code into a numerical representation that captures its structural and behavioral characteristics. The representation can be formed using techniques such as abstract syntax trees, opcode sequences, or n-grams and the like. In some embodiments, a SimHash value for a piece of malicious code is determined using a process including, converting the code into its numerical representation, such as an abstract syntax tree or opcode sequence, applying a hash function to generate hash values for different parts of the code representation, and combining the hash values using a weighted sum or bitwise operations to create a single hash value, the SimHash value. Each bit in the SimHash represents the sign (positive or negative) of the weighted sum of the hash values for that bit position.

Once the SimHash values for different samples of malicious code is determined, the values can be compared to measure their similarity. The similarity between two SimHash values is typically determined by counting the number of matching bits or calculating a similarity score based on bitwise operations. As such, in accordance with the present principles, SimHash vector-based hashing helps identify similarities between different malware samples, even if they have been obfuscated or modified. By converting the code into a numerical representation and generating SimHash values, it enables efficient detection of variants, identification of code reuse, and clustering of similar malware families.

The MinHash vector-based hashing is a technique that functions to represent malware samples as sets of unique features or characteristics. In some embodiments, these features can include functions, API calls, code snippets, or other meaningful elements extracted from the malware code. To determine a MinHash signature for a malware sample, the technique can include extracting the unique features or characteristics from the malware code, for each feature, applying a hash function to generate a hash value, and tracking the smallest hash value encountered for each feature. The resulting set of smallest hash values forms the MinHash signature for the malware sample.

Once the MinHash signatures for different malware samples are determined, they can be compared to estimate their similarity. A core idea behind MinHash is that similar malware samples will tend to have more shared smallest hash values in their signatures. In some embodiments, to estimate the similarity between two malware samples, a Jaccard similarity coefficient can be determined. This coefficient is derived from the number of shared smallest hash values divided by the total number of unique smallest hash values across both samples. The Jaccard similarity coefficient ranges from 0 to 1, with 1 indicating identical sets of features and 0 indicating no shared features. In the context of malware detection, MinHash enables the identification of similarities and patterns among different malware samples, even if they have been obfuscated or modified. By converting the code into sets of features and generating MinHash signatures, an efficient identification of malware variants, detection of code reuse, and clustering of similar malware families is provided.

Figure 4:
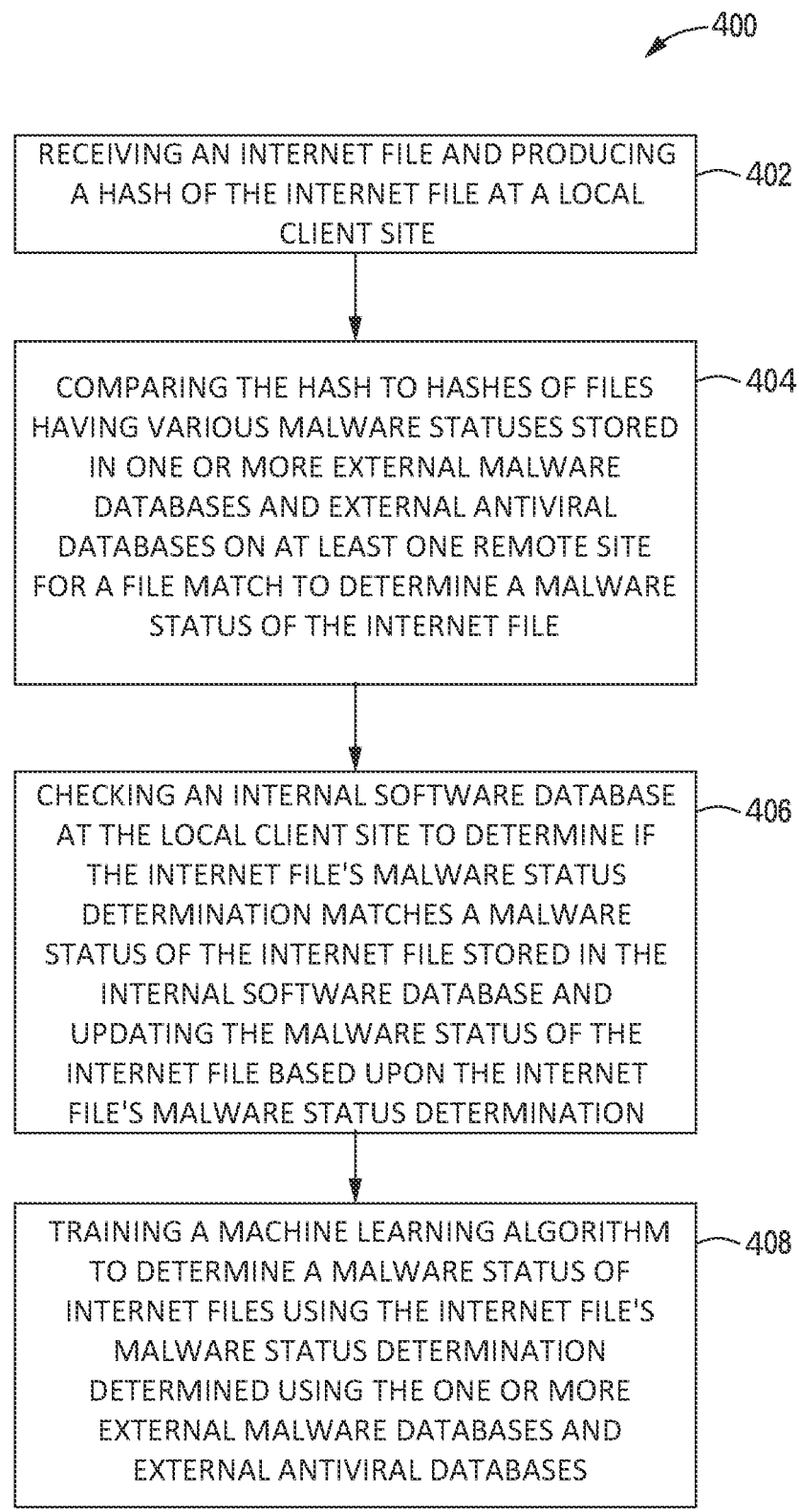
FIG. 4 depicts a flow diagram of a method for training a computer security algorithm, in accordance with an alternate embodiment of the present principles.

FIG. 4 depicts a flow diagram 400 of a method of computer security in accordance with an alternate embodiment of the present principles. The method 400 of FIG. 4 can begin at 402 during which an Internet file is received and a hash of the Internet file is produced at, for example, a local client site. The method 400 can proceed to 404. At 404, the hash is compared to hashes of files having various malware statuses stored in one or more external malware databases and external antiviral databases on at least one remote site for a file match to determine a malware status of the Internet file. The method 400 can proceed to 406. At 406, an internal software database is checked at the local client site to determine if the Internet file's malware status determination, determined using the one or more external malware databases and external antiviral databases, matches a malware status of the Internet file stored in the internal software database. The method 400 can proceed to 408.

At 408, a machine learning algorithm is trained to determine a malware status of Internet files using the Internet file's malware status determination determined using the one or more external malware databases and external antiviral databases.

The method 400 can be exited.

Referring back to FIG. 1, in some embodiments the external malware databases 120 and external antiviral databases 122 are commercially and/or publicly available sources, e.g. third party solutions, which provided a classification for the Internet file 108 such as malicious files group, a benign files group, and an unknown files group, known malicious file producer group, or the like, e.g. safety classifications. Also, for instance, the labeled data set 128 uses a similar classification system as the external malware databases 120 and external antiviral databases 122 to note each Internet file 108 as malicious files group, a benign files group, and an unknown files group, known malicious file producer group, or the like.

In some embodiments, the Internet file 108 is selected by at least one of a user 132 and a web-crawler 134, and the Internet file 108 is at least one executable or binary file. In some embodiments, the Internet file 108 may be a text file, PDF, image file, or other type of file. For example, the web-crawler 134 is pulling down (i.e., identifying and downloading) Internet files 108 continuously to generate the largest data set of Internet files it can for system 100. In other embodiments, the external malware databases 120 and external antiviral databases 122 are each running on a separate local sandboxed virtual machines 136 during the hash comparison. A dynamic behavioral analysis may also be performed on the file on one or more separate sandboxed local virtual machines 136 to determine the malware status of a file. In other embodiments, the external malware databases 120 and external antiviral databases 122 are each running on remote servers having one or more separate remote sandboxed virtual machines 137 during the hash comparison. A dynamic behavioral analysis may also be performed on the file on one or more separate sandboxed remote virtual machines 137 to determine the malware status of a file.

In some embodiments, the report 130 is generated when the weighted consensus algorithm 124 conflicts with a confidence algorithm 138 that crosschecks the weighted consensus algorithm, and the weighted consensus algorithm and the confidence algorithm are updated based upon the crosschecking using the machine learning algorithm 126. For instance, the weighted consensus algorithm 124 calculates for the Internet file 108 a safety classification by adding up the number of malicious files group, e.g. true/yes, a benign files group, e.g. false/no, and an unknown files group, e.g. send for further study, determinations from the external malware databases 120 and external antiviral databases 122 to render a score, while the confidence algorithm 138 adds a reliability assessment of each of the external malware databases 120 and external antiviral databases' 122 historical records for accuracy in determining the correct safety classification. In other embodiments, the system 100 interprets the results of the external malware databases 120 and external antiviral databases 122 to generate the weighted consensus algorithm 124 and/or the confidence algorithm 138.

In some embodiments, the weighted consensus algorithm 124 and/or the confidence algorithm 138 are statistical probabilities. In other embodiments, the weighted consensus algorithm 124 and/or the confidence algorithm 138 are continuously updated.

In some embodiments, the Internet file's 108 status determination is separated into a malicious files group, a benign files group, and an unknown files group depending on the initial analysis performed. The files that are identified as "unknown" and placed in the unknown files group are at least one of (A) identified or reported for additional static analysis on the files after a period of time by the system 100, and/or (B) identified or reported for manual examination. In other embodiments, the files in the malicious files group, the benign files group, and the unknown files group are used by a second machine learning algorithm 140 to derive an improved Internet file's 108 status that is then static analyzed for a final Internet files' status determination, which is then used to train the machine learning algorithm 126.

In one embodiment, the system 100 communicates over a communications network 146, which enables a signal to travel anywhere within the system and/or to any other component/system connected to the system. The communications network 146 is wired and/or wireless, for example. The communications network 146 is local and/or global with respect to system 100, for instance.

In some embodiments, the Internet file 108 is at least one of the files downloaded by a user 132 and detected by a scan library 142 running on user system 102. For instance, the scan library 142 is a subset of the internal malicious software database 103. In other embodiments, the scan library may be a shared scan library 143 located on a remote system and may be accessed by one or more users 132. In other embodiments, the Internet file 108 is at least one of the files scraped by a web-crawler 134 or other program, designed to find files on the internet and include to the internal malicious software database 104.

In some embodiment, system 100 includes a core infrastructure 101 that includes an application system driver 106 that receives user files 108 such as Internet files, produces a hash, and compares the hash with hashes stored in an internal malicious software database 104 of known malware. In some embodiments, if the hash is found among malicious examples stored in the internal malicious software database 104, the malicious file associated with the hash is deleted from the user system 102. In other embodiments, if the hash is found among malicious examples stored in the internal malicious software database 104, additional or other actions may be performed including one or more alerting one or more users that the file is malicious, quarantining the file, and the like. However, if the hash is not found, the core infrastructure can consult external databases and services to check for malicious examples; contemporaneously with that process, system 100 checks the same file 108 hash at its independent machine learning algorithm 126 on the core infrastructure. After both methods produce results, system 100 compares the outcomes and gives feedback to the machine learning algorithm 126 on the core infrastructure and uses this for supervised training of the machine learning algorithm 126. After many rounds of this feedback, the machine learning algorithm 126 on the core infrastructure will be able to detect malware with the same or better accuracy than external sources, e.g. external malware databases 120 and external antiviral databases 122.

In some embodiments, for a given file, the processor/driver 106 determines or calculates a hash and compares calculated hash with a database of known malicious hashes stored in the internal malicious software database 104. In some embodiments, if there is a match with the hash and the file is deemed malicious, the file is deleted. In other embodiments, if the hash is found among malicious examples stored in the internal malicious software database 104, additional or other actions may be performed including one or more alerting one or more users that the file is malicious, quarantining the file, and the like. As discussed above, the system 100 also consults other databases, 120 and 122 for instance to determine if the file is malicious. The system 100 can independently check results using its machine learning algorithm 126, and that info can be used to train the machine learning algorithm 126.

In some embodiments, the machine learning algorithm 126 training is automated because it learns from other products, e.g. external malware databases 120 and external antiviral databases 122, and thus system 100 can have not a single external source but many external sources.

Figure 2:
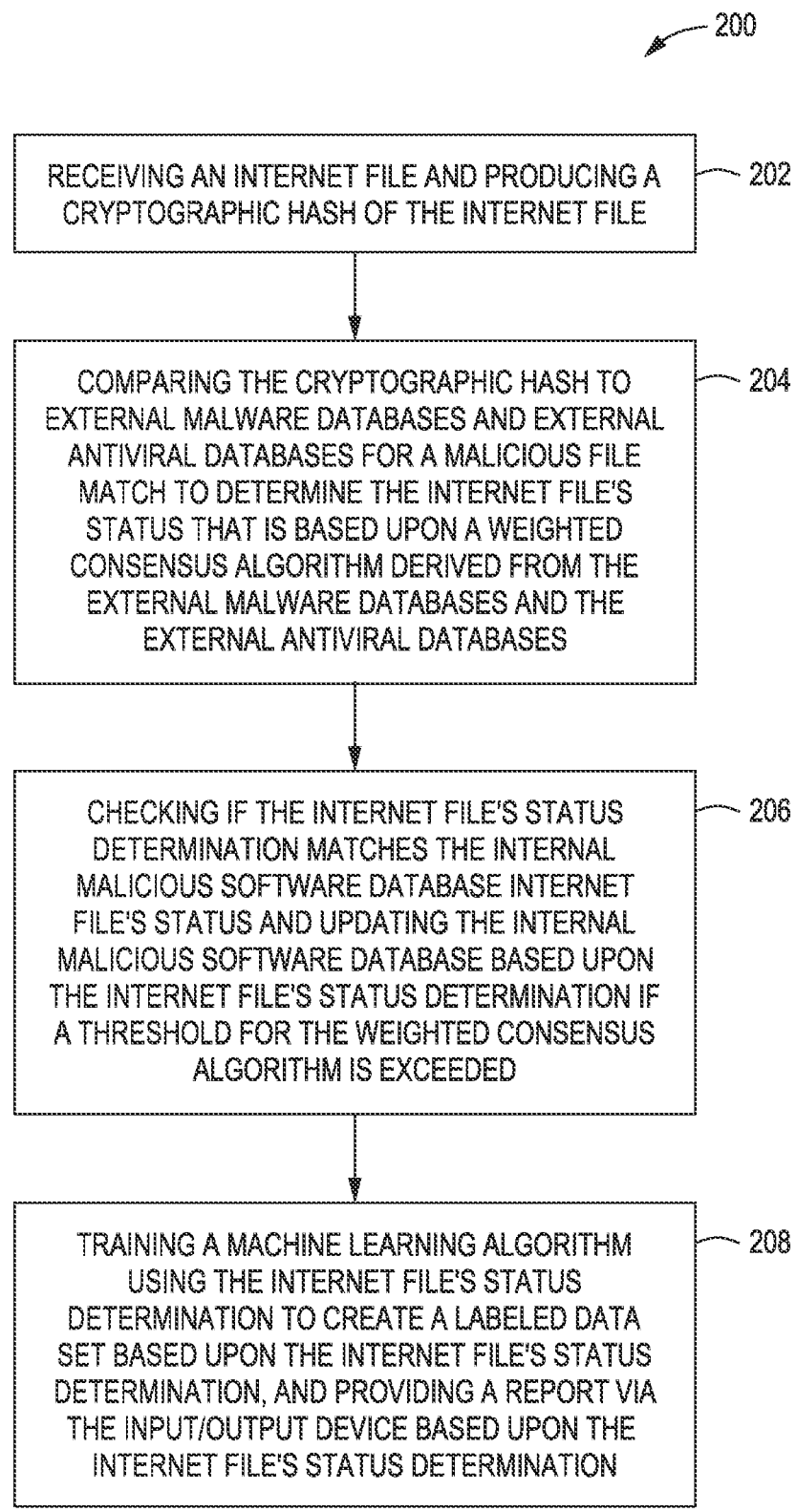
FIG. 2 depicts a flow diagram of a method for training a computer security algorithm, in accordance with an embodiment of the present principles.

FIG. 2 is an example process 200 a flow diagram of a method for computer security algorithm training, in accordance with an embodiment of the present principles. Such a process 200 may begin at 202 by receiving an Internet file and producing a hash of the Internet file. The method may also include comparing the hash to external malware databases and external antiviral databases for a malicious file match to determine the Internet file's status that is based upon a weighted consensus algorithm derived from the external malware databases and the external antiviral databases at 204. The method may additionally include checking if the Internet file's status determination matches the internal malicious software database Internet file's status and updating the internal malicious software database based upon the Internet file's status determination if a threshold for the weighted consensus algorithm is exceeded at 206. The method also includes training a machine learning algorithm using the Internet file's status determination to create a labeled data set based upon the Internet file's status determination, and providing a report via the input/output device based upon the Internet file's status determination at 208.

FIG. 2 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

Figure 3:
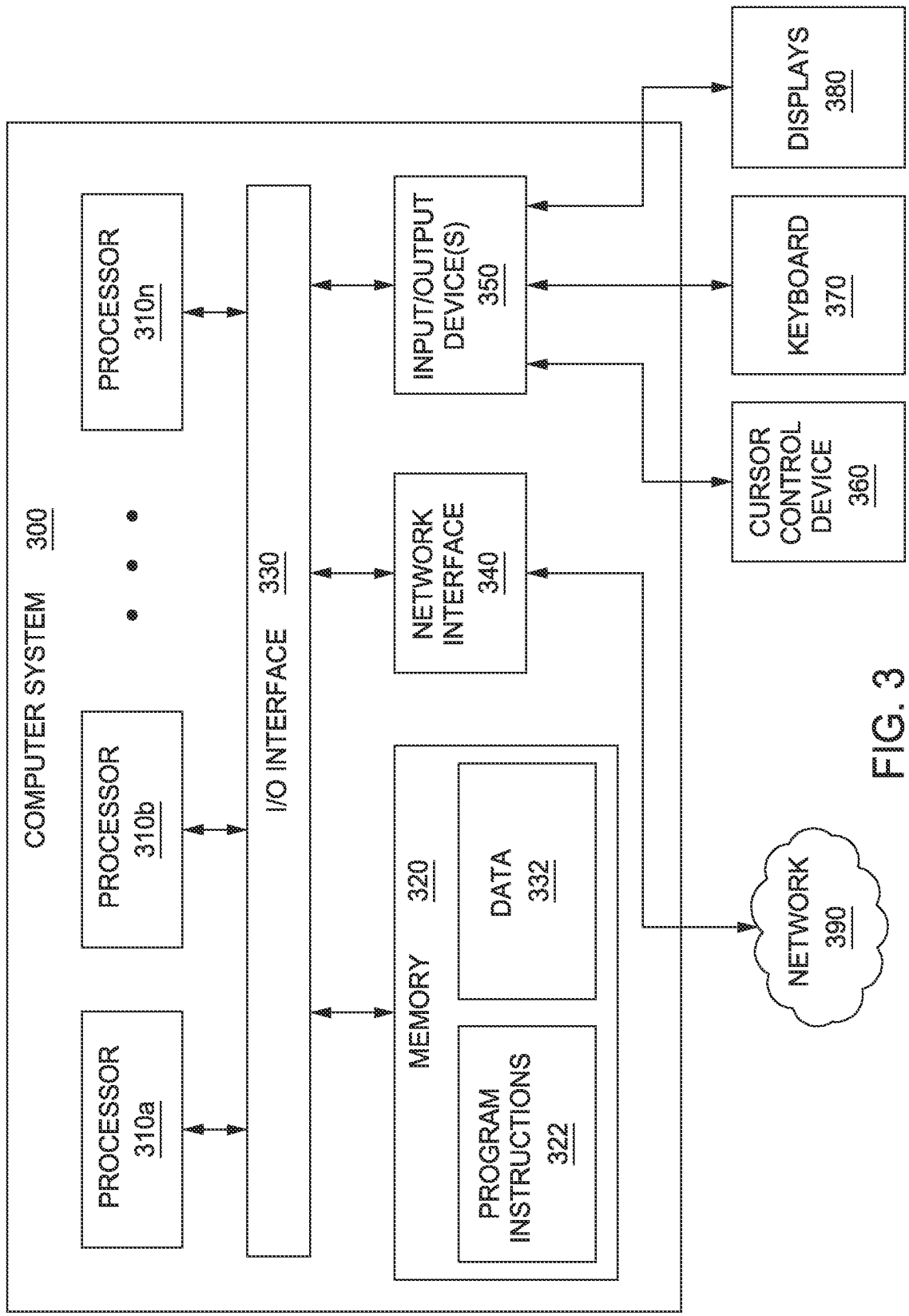
FIG. 3 depicts a high-level block diagram of a computing device suitable for use with embodiments for training a computer security algorithm in accordance with the present principles.

FIG. 3 depicts a computer system 300 that can be utilized in various embodiments of the invention to implement the computer and/or the display, according to one or more embodiments.

Various embodiments of method and system for training a computer security algorithm, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement the method 200 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

What is claimed is:

1. A method of computer security comprising:
   receiving an Internet file and producing a hash of the Internet file at a local client site;
   comparing the hash to hashes of files having various malware statuses stored in one or more external malware databases and external antiviral databases on at least one remote site for a file match to determine a malware status of the Internet file;
   checking an internal software database at the local client site to determine if the Internet file's malware status determination, determined using the one or more external malware databases and external antiviral databases, matches a malware status of the Internet file stored in the internal software database and updating the malware status of the Internet file stored in the internal software database based upon the Internet file's malware status determination; and
   training a machine learning algorithm to determine a malware status of Internet files using the Internet file's malware status determination determined using the one or more external malware databases and external antiviral databases.

2. The method of claim 1, wherein the hash is vector-based hash.

3. The method of claim 2, wherein the vector-based hash is created using a vector-based hashing technique comprising at least one of Locality Sensitive Hashing, SimHash, or MinHash.

4. The method of claim 1, wherein the malware status determination of the Internet file is based upon a weighted consensus algorithm derived from statuses associated with the hash stored in the one or more external malware databases and external antiviral databases.

5. The method of claim 4, wherein the internal software database is updated based upon the Internet file's malware status determination if a threshold for the weighted consensus algorithm is exceeded.

6. The method of claim 4, further comprising:
   generating a report based upon the Internet file's malware status determination.

7. The method of claim 4, wherein the report is generated when the weighted consensus algorithm conflicts with a confidence algorithm that crosschecks the weighted consensus algorithm, and the weighted consensus algorithm and the confidence algorithm are updated based upon the crosschecking using the machine learning algorithm.

8. The method of claim 1, wherein training a machine learning algorithm using the Internet file's malware status determination includes creating a labeled data set based upon the Internet file's malware status determination.

9. The method of claim 1, wherein the Internet file is selected by at least one of a user and a web-crawler, and the Internet file is at least one executable or binary file.

10. The method of claim 1, wherein the Internet file's malware status determination is separated into a malicious files group, a benign files group, or an unknown files group, and wherein the files in the unknown files group are at least one of identified or reported for additional static analysis on the files after a period of time or identified or reported for manual examination.

11. The method of claim 10, wherein the malicious files group, the benign files group, and the unknown files group are used by a second machine learning algorithm to derive an improved Internet file's malware status that is then analyzed for a final Internet file's malware status determination, which is then used to train the machine learning algorithm.

12. A computer security system comprising:
an input/output device;
an internal software database;
a processor programmed to:
receive, using the input/output device, an Internet file and produce a hash of the Internet file;
compare the hash to hashes of files having various malware statuses stored in one or more external malware databases and external antiviral databases for a file match to determine a malware status of the Internet file;
check the internal software database at the local client site to determine if the Internet file's malware status determination, determined using the one or more external malware databases and external antiviral databases, matches a malware status of the Internet file stored in the internal software database and update the malware status of the Internet file stored in the internal software database based upon the Internet file's malware status determination; and
train a machine learning algorithm to determine a malware status of Internet files using the Internet file's malware status determination determined using the one or more external malware databases and external antiviral databases.

13. The computer security system of claim 12, wherein the hash is vector-based hash.

14. The computer security system of claim 13, wherein the vector-based hash is created using a vector-based hashing technique comprising at least one of Locality Sensitive Hashing, SimHash, or MinHash.

15. The computer security system of claim 12, wherein the malware status determination of the Internet file is based upon a weighted consensus algorithm derived from malware statuses associated with the hash stored in the one or more external malware databases and external antiviral databases.

16. The computer security system of claim 15, wherein the malware status determination of the Internet file is based upon a weighted consensus algorithm derived from malware statuses associated with the hash stored in the one or more external malware databases and external antiviral databases and wherein the internal software database is updated based upon the Internet file's malware status determination if a threshold for the weighted consensus algorithm is exceeded.

17. The computer security system of claim 15, wherein the processor is further programmed to provide a report via the input/output device based upon the Internet file's malware status determination and wherein the report is generated when the weighted consensus algorithm conflicts with a confidence algorithm that crosschecks the weighted consensus algorithm, and the weighted consensus algorithm and the confidence algorithm are updated based upon the crosschecking using the machine learning algorithm.

18. The computer security system of claim 12, wherein training a machine learning algorithm using the Internet file's malware status determination includes creating a labeled data set based upon the Internet file's malware status determination and wherein the Internet file is selected by at least one of a user and a web-crawler, and the Internet file is at least one executable or binary file.

19. The computer security system of claim 11, wherein the Internet file's malware status determination is separated into a malicious files group, a benign files group, or an unknown files group, and wherein the files in the unknown files group are at least one of at least one of identified or reported for additional static analysis on the files after a period of time or identified or reported for manual examination and wherein the malicious files group, the benign files group, and the unknown files group are used by a second machine learning algorithm to derive an improved Internet file's malware status that is then analyzed for a final Internet file's malware status determination, which is then used to train the machine learning algorithm.

20. A non-transitory computer readable storage medium having stored thereon a plurality of instructions that when executed by a processor of a computer security system that performs a method of algorithm training comprising:
receiving an Internet file and producing a hash of the Internet file at a local client site;
comparing the hash to hashes of files having various malware statuses stored in one or more external malware databases and external antiviral databases on at least one remote site for a file match to determine a malware status of the Internet file;
checking an internal software database at the local client site to determine if the Internet file's malware status determination, determined using the one or more external malware databases and external antiviral databases, matches a malware status of the Internet file stored in the internal software database and updating the malware status of the Internet file stored in the internal software database based upon the Internet file's malware status determination; and
training a machine learning algorithm to determine a malware status of Internet files using the Internet file's malware status determination determined using the one or more external malware databases and external antiviral databases.

* * * * *